United States Patent
Akiyama et al.

(10) Patent No.: US 8,189,228 B2
(45) Date of Patent: May 29, 2012

(54) IMAGE FORMING APPARATUS, PRINT CONTROL METHOD AND CONTROL PROGRAM

(75) Inventors: Fumihito Akiyama, Yokohama (JP); Yoshinori Tanaka, Koganei (JP); Masahiro Ozawa, Hino (JP); Jun Kuroki, Sagamihara (JP); Hiroshi Nogawa, Hachioji (JP); Yasufumi Aoyama, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 623 days.

(21) Appl. No.: 12/361,100

(22) Filed: Jan. 28, 2009

(65) Prior Publication Data

US 2009/0219576 A1    Sep. 3, 2009

(30) Foreign Application Priority Data

Feb. 1, 2008    (JP) .............................. JP2008-022788

(51) Int. Cl.
*G06K 15/00*    (2006.01)
(52) U.S. Cl. .................... 358/1.16; 358/1.9; 358/1.13
(58) Field of Classification Search .................... 358/1.9, 358/1.13, 1.15, 1.16
See application file for complete search history.

(56) References Cited

U.S. PATENT DOCUMENTS

| | | | |
|---|---|---|---|
| 6,924,826 B1 | 8/2005 | Nakagiri et al. | |
| 7,916,332 B2 * | 3/2011 | Kato ............................ | 358/1.15 |
| 2005/0210227 A1 | 9/2005 | Emerson et al. | |
| 2006/0023239 A1 * | 2/2006 | Ferlitsch ...................... | 358/1.13 |
| 2008/0024802 A1 * | 1/2008 | Kato ............................. | 358/1.9 |
| 2008/0162736 A1 * | 7/2008 | Tanaka ........................... | 710/7 |
| 2008/0297838 A1 * | 12/2008 | Matsui et al. ................ | 358/1.15 |
| 2008/0304102 A1 * | 12/2008 | Saito ............................ | 358/1.15 |
| 2009/0021757 A1 * | 1/2009 | Liu et al. ..................... | 358/1.13 |
| 2009/0059278 A1 * | 3/2009 | Fukunishi .................... | 358/1.15 |
| 2009/0116063 A1 | 5/2009 | Takashima | |
| 2011/0007355 A1 * | 1/2011 | Hibino ......................... | 358/1.15 |
| 2011/0058204 A1 * | 3/2011 | Chae et al. .................. | 358/1.13 |

OTHER PUBLICATIONS

European Search Report dated Mar. 24, 2010.
Japanese Office Action dated Nov. 6, 2009.

* cited by examiner

*Primary Examiner* — Kimberly A Williams
(74) *Attorney, Agent, or Firm* — Finnegan, Henderson, Farabow, Garrett & Dunner, L.L.P.

(57) ABSTRACT

An image forming apparatus is equipped with at least a first analyzing section to analyze first print setting information included in the print data and described outside the main body of the document data, a second analyzing section to analyze second print setting information included in the main body of the document data, a memory section having a memory area to memorize print setting information, a print setting control section to update print setting information stored in advance as default data in the memory area for each setting item on the basis of the first print setting information and thereafter to allow print setting information of setting items in the predetermined memory area to be updated further on the basis of the second print setting information except the setting items in which the print setting information has been updated on the basis of the first print setting information.

18 Claims, 9 Drawing Sheets

IMAGE FORMING APPARATUS, PRINT CONTROL METHOD AND CONTROL PROGRAM

BACKGROUND OF THE INVENTION

The present invention relates to an image forming apparatus, a print control method and a control program. Especially, the present invention relates to an image forming apparatus for printing XPS (XML Paper Specification) data, and a print control method and a control program therefor.

Printing apparatuses (hereafter, referred to image forming apparatuses), such as printers and digital MFPs (Multi-Functional Peripherals) have been widely used. In the case where such an image forming apparatus is used as a network printer, firstly, document data is produced by application software installed in a host computer connected to a network. Subsequently, the document data is converted into print data of the page description language (PDL) format by a device driver (printer driver) installed in the host computer, and is transmitted to the image forming apparatus. Then, the image forming apparatus analyzes the print data and outputs images onto paper media.

Here, as the application software to produce documents, well known is application software which works on the basis of a specification called "XPS" which describes documents with the format of XML (Extensible Markup Language). Document data (hereafter, referred to XPS data) produced on the basis of the XPS make it possible to conduct a direct printing process, and in recent years, an image forming apparatus capable of handling the XPS data has been provided. With regard to the XPS specification, for example, the following document discloses about it in detail.

XML Paper Specification Version 1.0 (http://www.microsoft.com/japan/whdc/xps/xpsspec.mspx)

In the case of instructing printing by the use of document data produced by ordinary application software, a host computer produces print data added with a PJL (Printer Job Language) command describing print setting information, such as the number of print sets, the designation of duplex print and the size of print sheets at the head of document data, and transmits the print data to an image forming apparatus. Then, the image forming apparatus analyzes the PJL command and stores the print setting information in a predetermined memory region. Thereafter, the image forming apparatus conducts a printing process with reference to the print setting information.

On the other hand, in the case of conducting a direct printing process by the use of XPS data, a host computer produces print data added with a PJL command describing print setting information at the head of XPS data, and transmits the print data to an image forming apparatus. Here, the XPS data is configured with a plurality of parts in which there is a part called "Print Ticket". In the Print Ticket, the same as the above PJL command, print setting information, such as the number of print sets, the designation of both side printing and the size of print sheets can be described. Therefore, if a PJL command is added to XPS data in which print setting information is described in a Print Ticket, print data is eventually provided with two pieces of print setting information in which one is specified by the PJL command and another one is specified by the Print Ticket.

In this case, an image forming apparatus firstly analyzes the PJL command and stores the print setting information specified by the PJL command in a predetermined memory region. Thereafter, the image forming apparatus further analyzes the XPS data and stores the print setting information described by the Print Ticket in the above predetermined memory region by overwriting the previously stored print setting information. Accordingly, the print setting information of the Print Ticket in the XPS data is given priority over the print setting information of the PJL command. As a result, although print setting is conducted with the PJL command, a problem that printing is conducted in accordance with print setting in the Print Ticket in the XPS data, eventually arises.

Concretely, as shown in FIG. 8, a conventional image forming apparatus capable of conducting a direct printing process with XPS data is equipped with a data analyzing section 34a, a Print Ticket analyzing section 34b, a print control section 34d, a printing section 34e, an engine 35 and a print setting information holding area 33a. In such an image forming apparatus structured with the above sections, before receiving print data, default data (data held inside) as shown in a part [1] is stored in each setting item in the print setting information holding area 33a. As such setting items in the part [1], "Copies" representing the number of copy sets is set to "1", "Duplex" representing the designation of duplex print is set to "OFF", and "Paper" representing the size of print paper is set to "A4".

In the case where XPS data added with a PJL command are transmitted, operations are conducted as shown in FIGS. 9 and 10. Firstly, the data analyzing section 34a reads print data from a host computer 20 at Step S201 in FIG. 10, and analyzes the print data at Step S202 so as to judges whether a PJL command has been added at the head of XPS data. As a result of the judgment, in the case where a PJL command has been added, the data analyzing section 34a analyzes the PJL command at Step S203, and stores print setting information described in the PJL command in the print setting information holding area 33a at Step S204. Here, since instructions to set the number of copy sets to "3" and the designation of duplex print to "ON" have been written in the PJL command, the data analyzing section 34a sets "Copies" to "3" and "Duplex" to "ON" in accordance with the instructions as shown in a part [2] in FIG. 9.

Subsequently, the data analyzing section 34a judges at Step S205 whether XPS data is included in the print data. In the case where XPS data does not exist in the print data, since data to be printed does not exist, the operation flow is ended. On the other hand, in the case where XPS data exists in the print data, at Step S206, the data analyzing section 34a judges whether a Print Ticket is included in the XPS data.

In the case where a Print Ticket exists in the XPS data, the data analyzing section 34a transmits the Print Ticket to the Print Ticket analyzing section 34b. Then, the Print Ticket analyzing section 34b analyzes the Print Ticket at Step S207, and stores print setting information described in the Print Ticket in the print setting information holding area 33a at Step S208. Here, since instructions to set the number of copy sets to "1", the designation of duplex print to "OFF" and the size of print sheets to "Letter" has been written in the Print Ticket, the Print Ticket analyzing section 34b sets "Copies" to "1", "Duplex" to "OFF" and "Paper" to "Letter" in accordance with the instructions as shown in a part [3] in FIG. 9.

Thereafter, at Step S209, the print control section 34d instructs the printing section 34e to print with reference to the print setting information stored in the print setting information holding area 33a, and the printing section 34e makes the engine 35 conduct a printing process.

SUMMARY

As stated above, the print setting information described in the PJL command is once stored in the print setting information holding area 33a. However, thereafter, the previously stored print setting information is overwritten with the print setting information described in the Print Ticket. Accordingly, the following printing process is conducted without utilizing the instructions by the PJL command.

The present invention has achieved in view of the above problems. A primary object of the present invention is to provide an image forming apparatus, a print control method and a control program with which even in the case where print data including print setting information in the main body of document data, a printing process can be conducted in accordance with print setting information described in the outside of the main body of document data.

To achieve at least one of the abovementioned objects, an image forming apparatus reflecting one aspect of the present invention comprises the followings.

That is, an image forming apparatus to conduct a printing process on the basis of print data including document data as a printing target, is equipped with at least a first analyzing section to analyze first print setting information which is included in the print data and is described in the outside of the main body of the document data, a second analyzing section to analyze second print setting information included in the main body of the document data, a memory section having a predetermined memory area to memorize print setting information, a print setting control section to update print setting information stored in advance as default data in the memory area for each setting item on the basis of the first print setting information and thereafter to allow print setting information of setting items in the predetermined memory area to be updated further on the basis of the second print setting information except the setting items in which the print setting information has been updated on the basis of the first print setting information, and a print control section to control the printing process on the basis of the document data in accordance with the print setting information memorized in the predetermined memory area.

DETAILED DESCRIPTION OF THE PREFERRED EMBODIMENT

Figure 1:
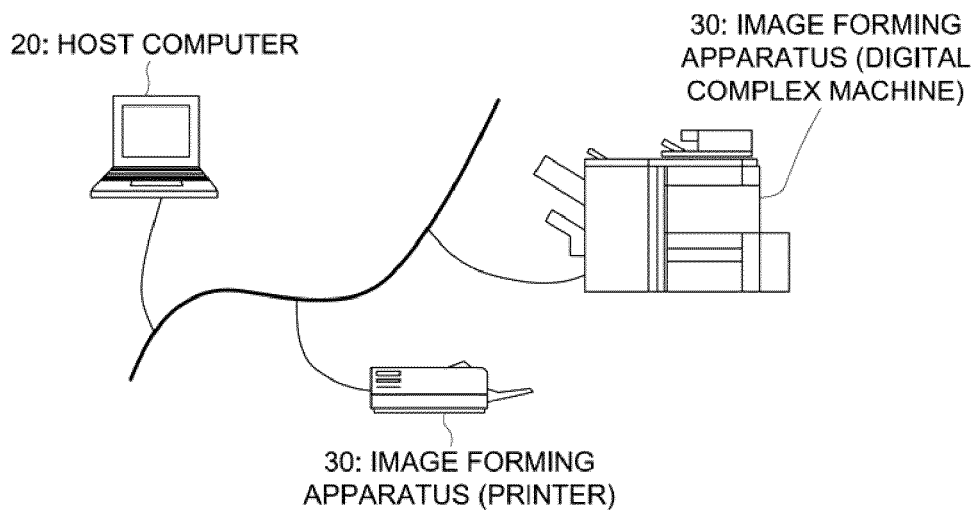
FIG. 1 is a schematic drawing showing a structure of a print control system according to one example of the present invention.

In the above image forming apparatus of the present invention, the following structures are further preferable. That is to say, the print setting control section is preferably structured to update print setting information of default data for each setting item on the basis of the first print setting information, to make the updated print setting information by setting a flag indicating "updatable or unupdatable" to "unupdatable" or by adding a flag indicating "unupdatable" for the updated setting items, and to allow print setting information of setting items in the predetermined memory area, provided with a flag showing "updatable" or of setting items not provided with a flag showing "unupdatable" to be updated further on the basis of the second print setting information.

Further, in the present invention, the print setting control section is preferably structured to set a flag corresponding to each of the setting items to "updatable" on the default state.

Further, in the present invention, the print setting control section is preferably structured to set the flag to "unupdatable" or add a flag showing "unupdatable" for setting items included in the first print setting information.

Further, in the present invention, the first print setting information is preferably information described in a PJL command.

Further, in the present invention, the document data is XPS data and the second print setting information is preferably information described in a Print Ticket in the XPS data.

As described in the section "BACKGROUND OF THE INVENTION", XPS data is well known as document data capable of being used for a direct printing process. Such XPS data is structured of essential elements and elements capable of being added optionally. The essential elements are configured with "Fixed Document Sequence" to store information of the entire of documents, "Fixed Document" to store information of the entire of pages, "Fixed Page" to store information of each page, "Font" to store font, "Image" to store images and the like. Further, the optional elements are configured with "Signature Part" to store digital signatures, and "Print Ticket" to store print setting information of "Job-level", "Document-level" or "Page-level".

In the case of conducting a direct printing process by the use of XPS data with the above configuration, print data in which a command described in the PJL format for example is added to the XPS data is transmitted to an image forming apparatus. Then, the image forming apparatus stores the print setting information of the PJL command in a predetermine memory area, and thereafter the image forming apparatus reads the XPS data and stores the print setting information in the Print Ticket in the above predetermined memory area by overwriting the previously stored information. Accordingly, even if a print setting is made with the PJL command, a problem that a printing process is conducted in accordance with the print setting in the Print Ticket of the XPS data, eventually arises.

For the above problems, the following methods may be considered in order to prevent the print setting information in the PJL command from being overwritten. For example, at the time of producing XPS data, a Print Ticket is edited to describe the same print setting information as that in the PJL command, or the Print Ticket is discarded.

However, since the XPS data is produced as compressed data, even if the XPS data is checked, it is difficult to judge what kind of print setting information is described in the XPS data. Further, in order to edit a Print Ticket in the XPS data, the compressed XPS data needs to be decompressed once. Further, after the Print Ticket has been edited, it is necessary to compress again the XPS data. In order to execute such processes, exclusive application software needs to be used. Furthermore, since the XPS data has a complicate configuration as stated above, even if the exclusive application software is used, it may be difficult to find out a Print Ticket from the XPS data. Therefore, it may be harsh to ask a user for such operations.

Accordingly, in the present embodiment, an image forming apparatus controls to give priority to the print setting information in the PJL command over the print setting information in the Print Ticket in the XPS data without editing the XPS data.

In order to conduct this control, in the image forming apparatus, there are provided a data analyzing section, a Print Ticket data analyzing section and a print setting control section as hardware or software. The print setting control section adds a update flag to instruct "permissible" or "impermissible" for updating at the time of writing the print setting information described in the PJL command into a predetermined memory area. Then, at the time of writing the print setting information described in the Print Ticket, the writing is controlled with reference to the update flag. With this control, if the update flag is set to "unupdatable" at the time of writing the print setting information in the PJL command, it becomes possible to prevent the previously stored print setting information from being overwritten by the print setting information in the Print Ticket, whereby the above problems can be avoided.

EXAMPLE

Figure 2:
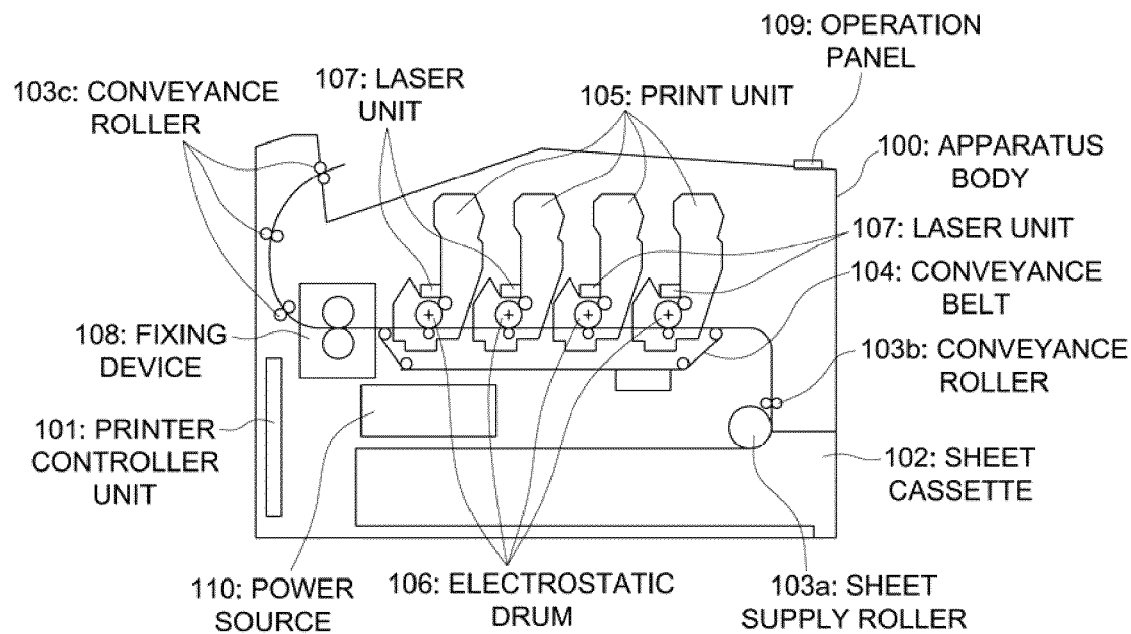
FIG. 2 is an illustration showing a concrete structure of an image forming apparatus according to one example of the present invention.
Figure 3:
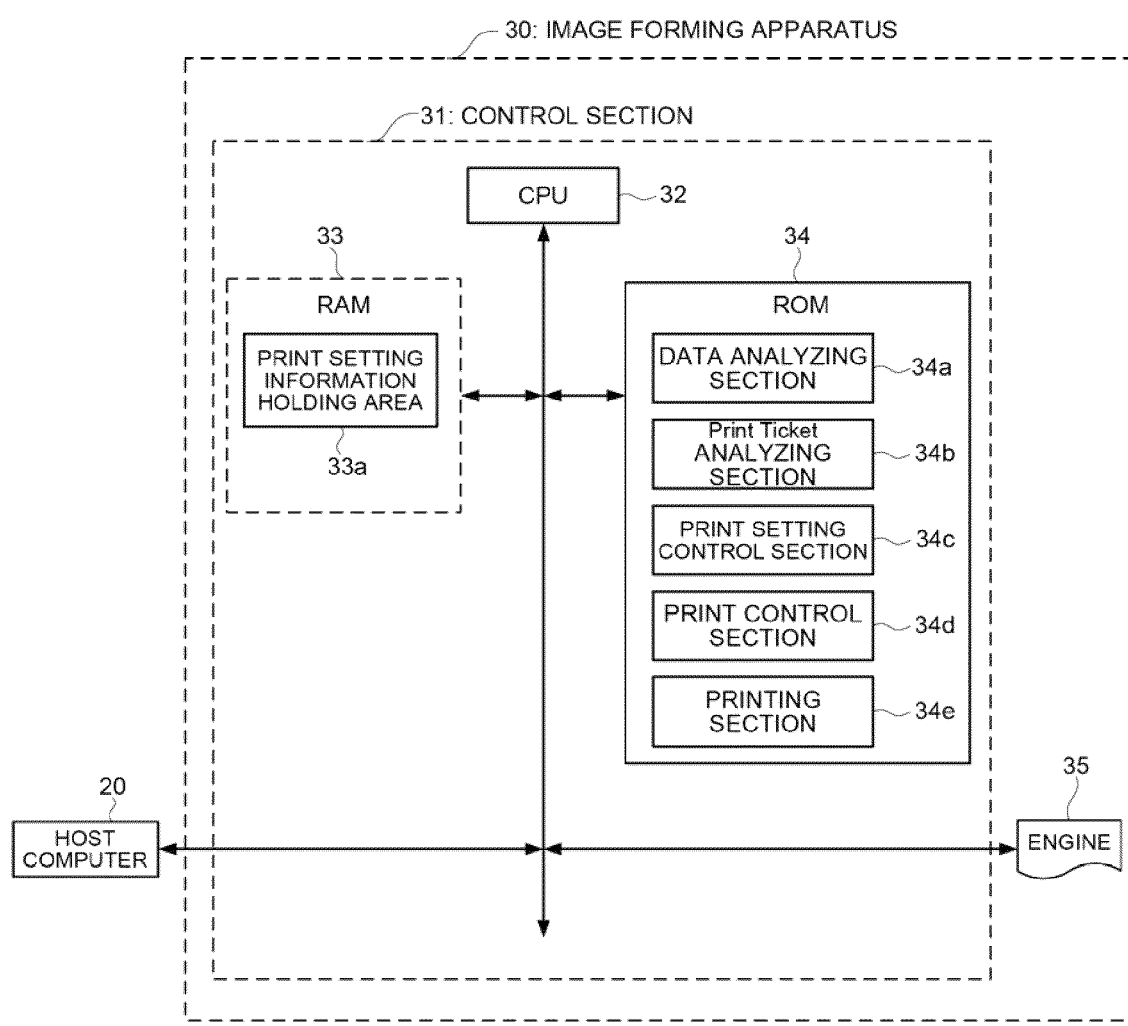
FIG. 3 is a block diagram showing a structure of a control section of an image forming apparatus according to one example of the present invention.
Figure 4:
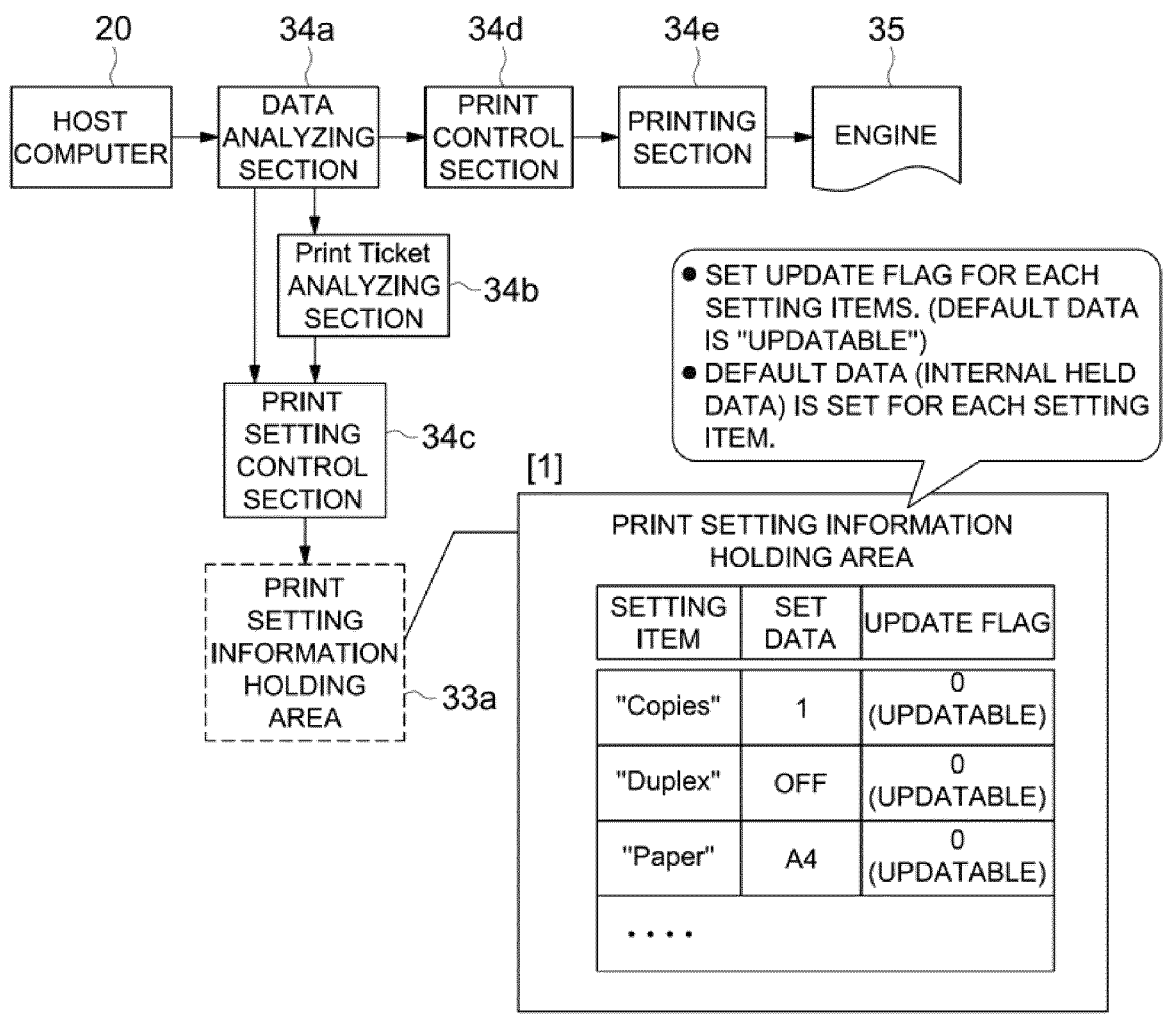
FIG. 4 is an illustration showing operations (default state) of an image forming apparatus according to one example of the present invention.
Figure 5:
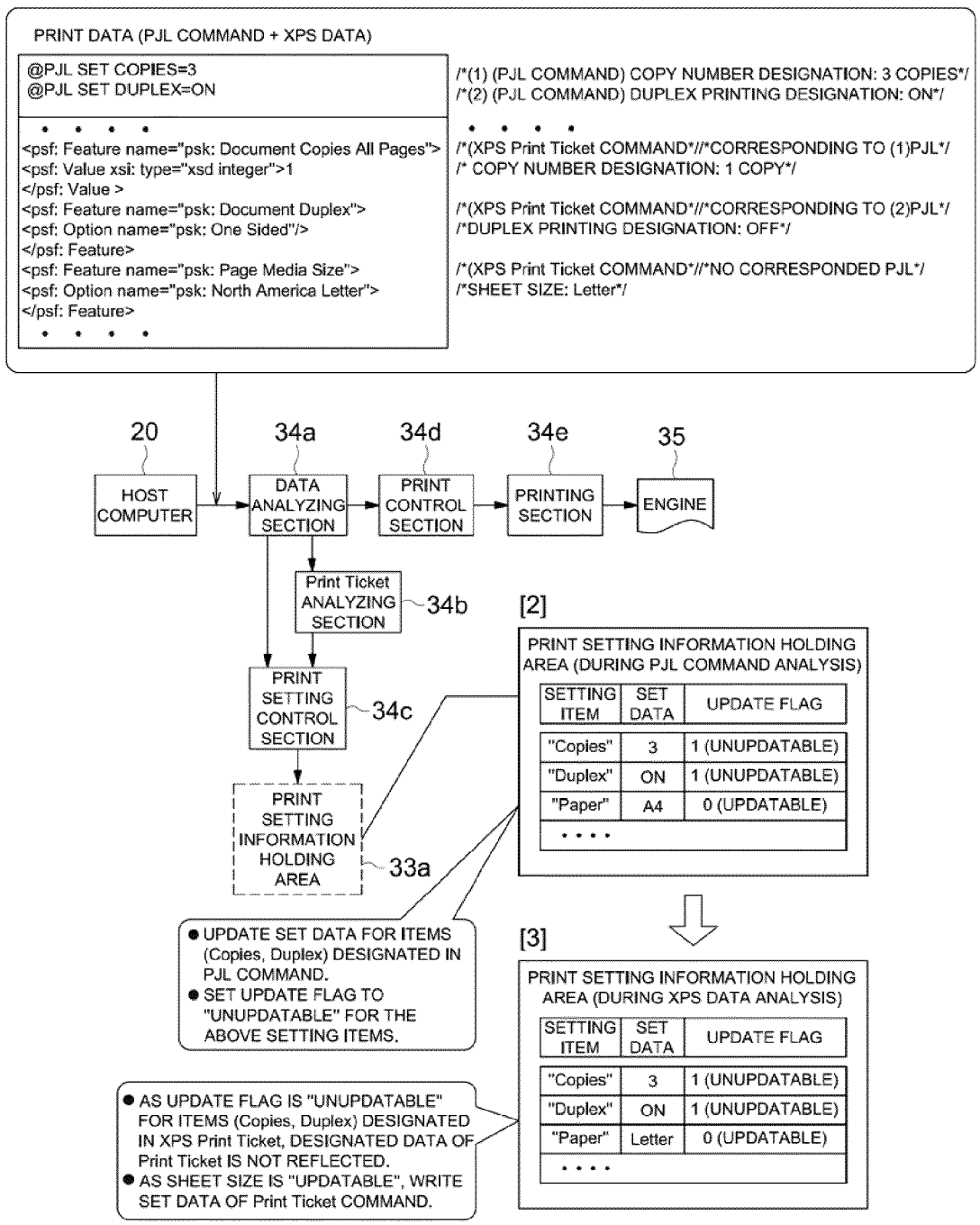
FIG. 5 is an illustration showing operations (at the time of receiving print data) of an image forming apparatus according to one example of the present invention.
Figure 6:
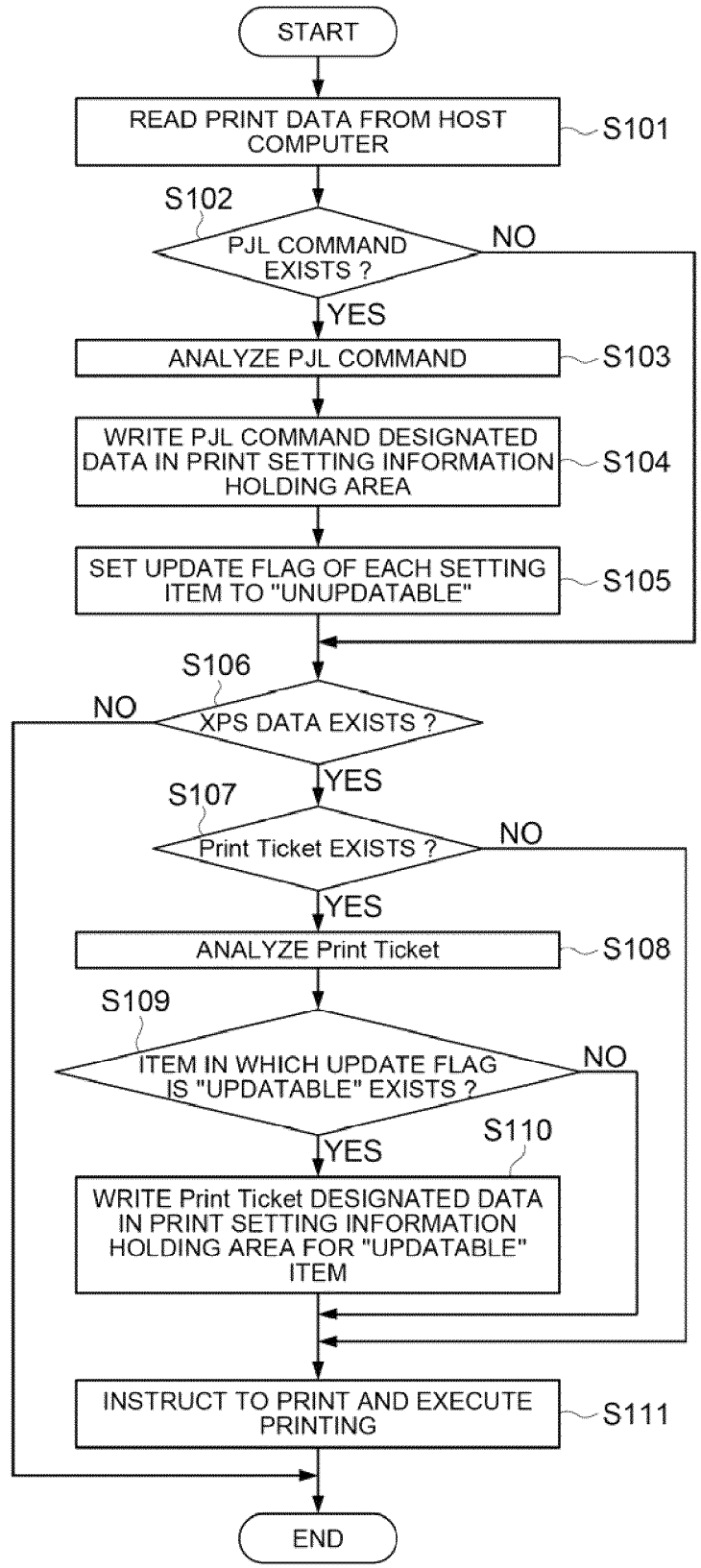
FIG. 6 is a flow chart showing print control procedures in an image forming apparatus according to one example of the present invention.
Figure 7:
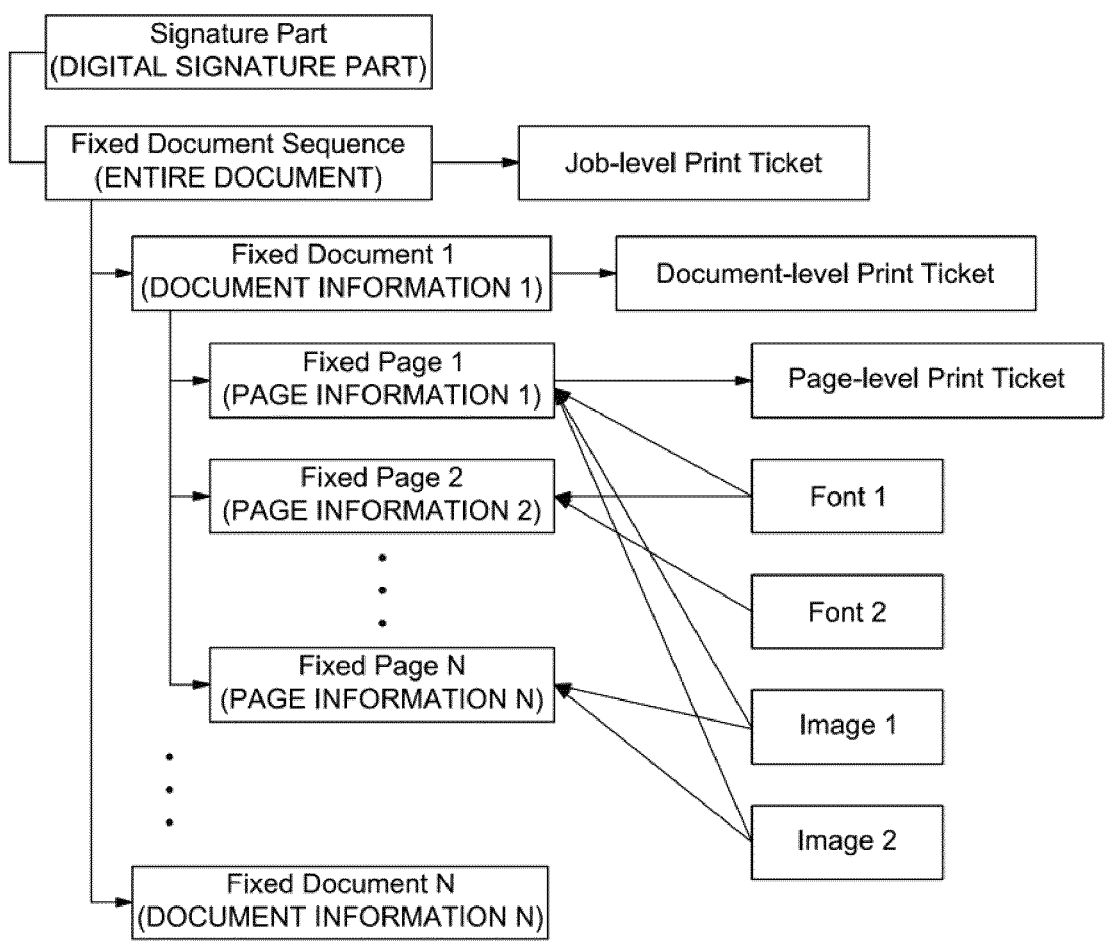
FIG. 7 is an illustration showing a structural example of XPS data.
Figure 8:
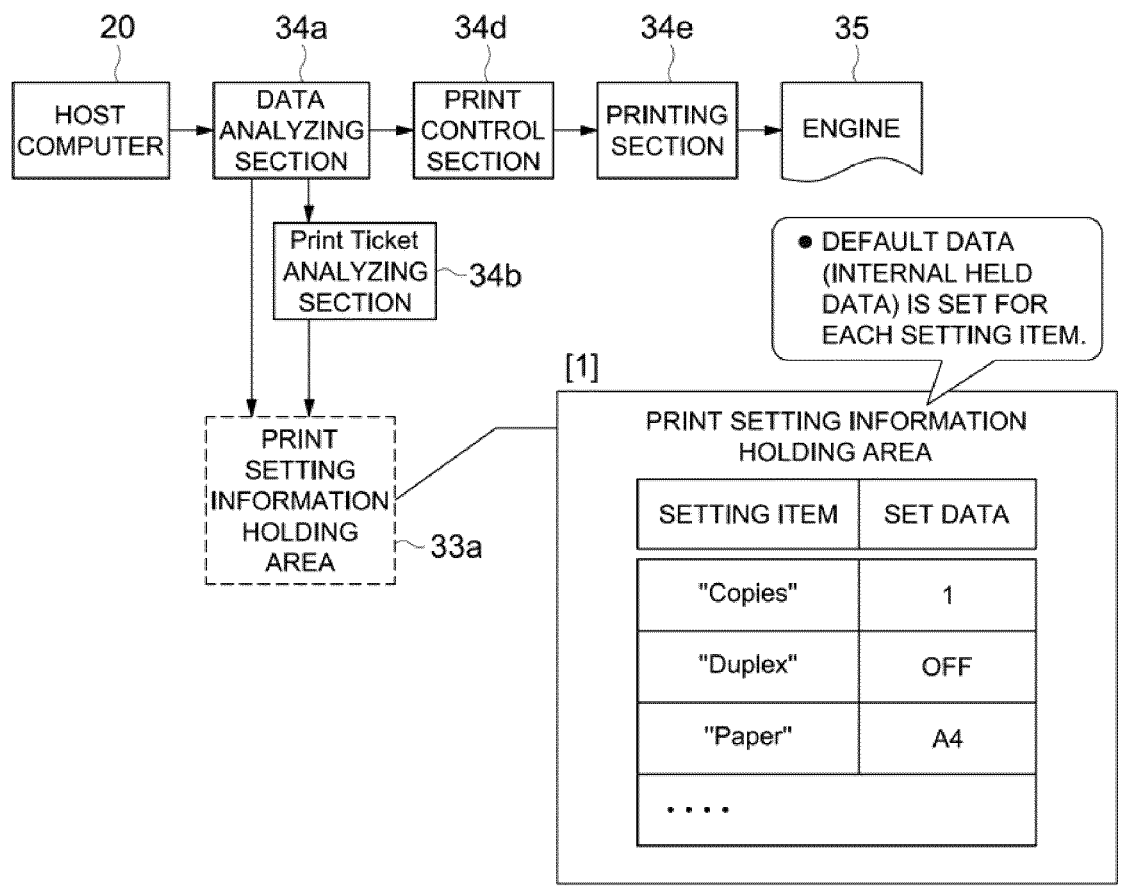
FIG. 8 is an illustration showing operations (default state) of a conventional image forming apparatus.
Figure 9:
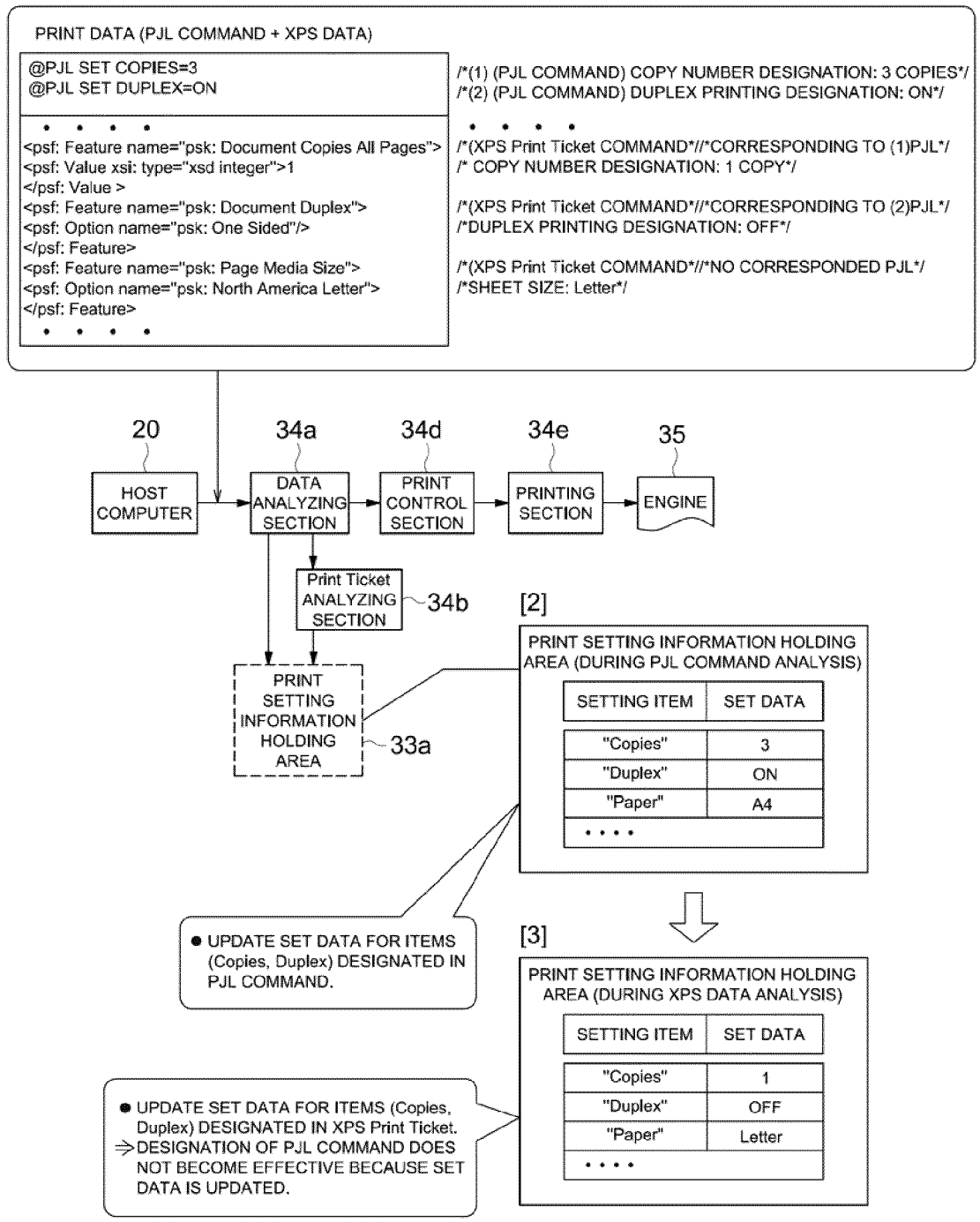
FIG. 9 is an illustration showing operations (at the time of receiving print data) of a conventional image forming apparatus.
Figure 10:
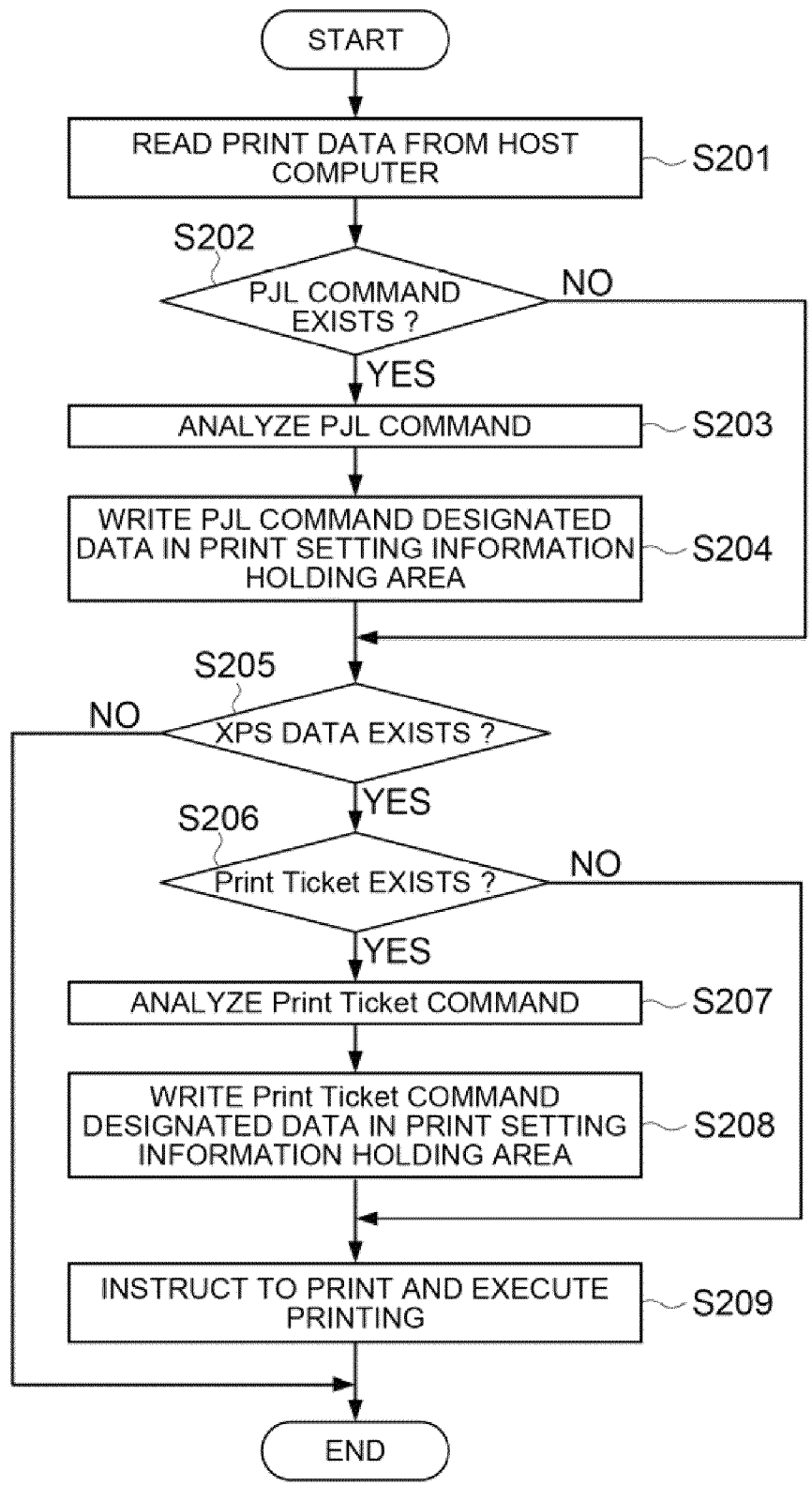
FIG. 10 is a flow chart showing a print control procedure in a conventional image forming apparatus.

In order to describe the above mentioned embodiment of the present invention in more detail, an image forming apparatus, a print control method and a control program according to one example of the present invention will be described with reference to FIG. 1 through FIG. 6. FIG. 1 is a schematic drawing showing an entire structure of a print control system according to the present example. Further, FIG. 2 is an illustration showing a concrete structure of the image forming apparatus, and FIG. 3 is a block diagram showing a structure of a control section of the image forming apparatus. Further, FIG. 4 and FIG. 5 are illustrations schematically showing operations of the image forming apparatus according to the present example, and FIG. 6 is a flow chart showing a print control procedure in the image forming apparatus according to the present example.

As shown in FIG. 1, a print control system 10 according to the present example comprises a host computer 20 such as a computer terminal and the like and an image forming apparatus 30 such as a printer and a digital complex machine, and the host computer 20 and the image forming apparatus 30 are connected with each other via a communication network such as LAN (Local Area Network) or WAN (Wide Area Network). The host computer 20 employs application software to produce document on the basis of a standard such as XPS, produces documents by the application software and transmits print data described with a page description language. Further, in the case of utilizing a direct printing function, the host computer 20 transmits an XPS format document (XPS document) or a PDF (Portable Document Format) format document (PDF document) included as document data in the print data. The image forming apparatus 30 prints the document data included in the print data.

The above mentioned image forming apparatus 30 has a concrete structure shown in FIG. 2. In FIG. 2, numeric symbol 100 indicates an apparatus main body. Numeric symbol 101 indicates a printer controller unit which converts data transmitted from the host computer 20 into video signals and outputs the video signals to a laser unit 107. The laser unit 107 emits a laser beam in accordance with the video signals in such a way that electrostatic latent images are formed on an electrostatic drum 106. These latent images are visualized to toner images by a print unit 105 and the toner images are transferred onto a recording paper. The recording paper is accommodated in a paper cassette 102. After a recording paper is picked up by a paper feed roller 103a from the paper cassette 102, the recording paper is conveyed by a conveyance roller 103b and a conveyance belt 104, and the toner images are transferred onto the recording paper. After the transferring, the toner images are fixed onto the recording paper by a fixing device 108. Then, the recording paper is discharged by a conveyance roller 103C. Further, numeric symbol 109 indicates an operation panel on which switches and the like to operate devices are arranged. Numeric symbol 110 indicates a power source to supply power to devices.

Here, FIG. 2 shows an image forming apparatus 30 with a structure (tandem type) having an electrostatic drum for each of four color components YMCK. However, the present invention can be applied to a structure (one drum type) having one electrostatic drum.

The structure of the major portion of the image forming apparatus 30 having the above construction can be indicated with a block diagram shown in FIG. 3 and is classified into a control section 31 corresponding to the printer controller unit 101 and an engine 35 to conduct a printing process.

The control section 31 is constituted with CPU (Central Processing Unit) 32, RAM (Random Access Memory) 33, ROM (Read Only Memory) 34 and the like. The CPU 32 develops a program memorized in the ROM 34 into the RAM 33 and executes the program.

Various kinds of data necessary for the operations of the image forming apparatus 30 are memorized in the RAM 33. In the present embodiment, in the print setting information holding area 33a, the print setting information preset as default data in the image forming apparatus 30, the print setting information described in a PJL command and the print setting information described in a Print Ticket in XPS data is stored.

Various kinds of programs necessary for the operations of the image forming apparatus 30 are memorized in the ROM 34. In this embodiment, programs to make a computer act as a data analyzing section 34a, a Print Ticket analyzing section 34b, a print setting control section 34c, a print control section 34d, a printing section 34e and the like are memorized.

The data analyzing section 34a analyzes the print data received from the host computer 20 and reads out a command which is positioned at the head of the print data and describes print setting information (here, in the present embodiment, the command is a command described with the PJL format, and hereafter the command is referred to a PJL command), and then, the data analyzing section 34a transmits the print setting information to the print setting control section 34c. Further, the data analyzing section 34a analyzes XPS data as document data, and in the case where a Print Ticket is added in the XPS data, the data analyzing section 34a transmits the Print Ticket to a Print Ticket analyzing section 34b.

The Print Ticket analyzing section 34b analyzes the Print Ticket received from the data analyzing section 34a and transmits the print setting information in the Print Ticket to the print setting control section 34c.

The print setting control section 34c stores the print setting information in the PJL command received from the data analyzing section 34a in a print setting information holding section 33a. At this time, the print setting control section 34c adds information (called a update flag) specifying "updatable" or "unupdatable" for each of setting items, sets the update flag to "unupdatable", and stores it. Further, the print setting control section 34c stores the print setting information in the Print Ticket received from the Print Ticket analyzing section 34b in the print setting information holding area 33a. At this time, the print setting control section 34c judges "updatable" or "unupdatable" of a update flag of each of setting items and stores the print setting information in the Print Ticket for setting items whose update flags are not set to "unupdatable".

The print control section 34d instructs a printing process to the printing section 34e with reference to the print setting information in the print setting information holding area 33a.

The printing section 34e produces a bit map image of each page and makes the engine 35 to conduct the printing process.

Here, FIG. 3 shows the case where the above sections are structured as forms of programs. However, the above sections may be provided as forms of hardware in the image forming apparatus 30.

Next, operations of the control section 31 will be described with reference to FIG. 4 through FIG. 6.

FIG. 4 shows a situation (default situation) before receiving print data. As shown in the part [1], default data (data held in the inside) is stored in each of setting items in the print setting information holding area 33a. Here, as the setting items, "Copies" representing the number of copy sets, "Duplex" representing the designation of duplex print, and "Paper" representing the size of print paper are exemplified, and "Copies" is set to "1", "Duplex" is set to "OFF", and "Paper" is set to "A4". Further, in a update flag of each of setting items to indicate "updatable" or "unupdatable", data "0" indicating "updatable" are stored as default data. These default data is set by the print setting control section 34c at the time of starting the image forming apparatus 30 or other times.

In such a default state, in the case of receiving print data including a PJL command added to XPS data, operations are conducted as shown in FIG. 5 and FIG. 6.

First, at Step S101 in FIG. 6, the data analyzing section 34a reads out print data from the host computer 20. The print data may be read out from HDD (Hard Disk Drive) of the image forming apparatus 30 or read out from another computer or server, which is connected to the network.

Next, at Step 5102, the data analyzing section 34a judges whether the print data is added with a PJL command.

In the case where a PJL command is not added, the operation flow is skipped to Step S106. On the other hand, in the case where a PJL command is added, at Step S103, the data analyzing section 34a analyzes the PJL command and transmits the print setting information in the PJL command to the print setting control section 34c.

Next, at Step S104, as shown in a part [2] in FIG. 5, the print setting control section 34c stores the print setting information in the PJL command in the print setting information holding area 33a. At this time, at Step S105, a update flag of each of setting items (here, "Copies" and "Duplex") in the PJL command is changed to "unupdatable". With this change, for the setting items having set to "unupdatable", hereafter, even if another print setting information is designated for the setting items, the print setting information is not applied to the setting items. In this way, in the case where print setting information is described as a PJL command in the outside of the main body of XPS data, the print setting information stored in advance as default data in the print setting information holding area 33a is updated for each of setting items with the print setting information designated by the PJL command.

Subsequently, at Step S106, the data analyzing section 34a judges whether XPS data exists in the print data, and in the case where XPS data does not exist, since a printing process cannot be conducted, the operation flow is ended.

On the other hand, in the case where XPS data exists, at Step S107, the data analyzing section 34a analyzes the XPS data and judges whether a Print Ticket exists in the XPS data. Then, when a Print Ticket does not exist, the operation flow is skipped to Step S111.

On the other hand, when a Print Ticket exists, the data analyzing section 34a transmits the Print Ticket to the Print Ticket analyzing section 34b. Then, at Step S108, the Print Ticket analyzing section 34b analyzes the Print Ticket, and transmits the print setting information in the Print Ticket to the print setting control section 34c.

Next, at Step S109, the print setting control section 34c checks the update flag of each of setting items stored in the print setting information holding area 33a and judges whether there are the setting items whose update flags are set to "updatable". As a result, when there is no item whose flag is set to "updatable", the operation flow is skipped to Step S111.

On the other hand, in the case where there are items whose flag are set to "updatable", at Step S110, as shown in a part [3] in FIG. 5, the print setting control section 34c stores the print setting information in the Print Ticket into the print setting information holding area 33a for the setting items having the update flags set to "updatable" among the setting items in the Print Ticket.

Here, in FIG. 5, since the update flag of the setting items "Copies" and "Duplex" are set to "unupdatable", the print information in the Print Ticket is not stored for these setting items. On the other hand, since the update flag of the setting items "Paper" is set to "updatable", "A4" set as the default data is updated to "Letter" which is the print setting information in the Print Ticket.

Next, at Step S111, the print control section 34d instructs a printing process to the printing section 34e with reference to the print setting information stored in the print setting information holding area 33a, and the printing section 34e makes the engine 35 conduct the printing process.

As described above, in the print setting information holding area 33a, for the setting items previously designated by the PJL command, the print setting information in the PJL command are held, and for the other setting items, the print setting information in the Print Ticket are held. Therefore, the printing process is conducted in accordance with the setting in the print setting information holding area 33a. Namely, in the PJL command, "Copies" is set to "3" and "Duplex" is set to "ON". Although, in the Print Ticket, "Copies" is set to "1" and "Duplex" is set to "OFF", the printing process is conducted finally on the condition that "Copies" is "3" and "Duplex" is "ON".

Here, in FIG. 4 and FIG. 5, the setting items of print setting information are described with reference to three items of "Copies", "Duplex" and "Paper" as one example. However, the setting items may include any setting item settable by the PJL command and the Print Ticket.

Further, in FIG. 4 and FIG. 5, with regard to setting items ("Paper" in this example) which are not designated by the PJL command, their update flags are made "updatable" while keeping the default data. However, for the setting items which are not designated by the PJL command, at Step S105, their update flags may also be set to "unupdatable" and the printing process is conducted on the condition of the default data (here, "A4").

Further, in the above description, the update flag of each of setting items of print setting information is structured to be set to "updatable" as default data.

However, each of the setting items of print setting information may be not added with a update flag as default data, and at the time of writing the print setting information of the PJL command, a update flag may be added to each of setting items of the written print setting information. In this case, the print setting control section 34c stores the print setting information of the Print Ticket in the print setting information holding area 33a only for setting items not added with a update flag among the setting items of the Print Ticket.

Further, the above embodiment is structured such that the print data including the PJL command added into the XPS data is transmitted. For example, when print setting information is set in a PJL command and then a printing process is conducted for plural sets of XPS data in accordance with the setting of the print setting information in the PJL command, it may be structured so that the plural sets of XPS data and the PJL command are transmitted separately. In this case, the print setting control section 34c may store the print setting information in the PJL command into the print setting information holding area 33a, and thereafter the print setting control section 34c holds the print setting information until receiving another PJL command.

Further, the present embodiment is structured such that the PJL command is added to the XPS data. However, the format of the command is not limited to the format of PJL. Also, the present embodiment is structured such that the PJL command is added into the head of the XPS data. However, the position where the PJL command is added is not limited to the head and the PJL command may be added at any position where the PJL command can be read earlier than the XPS data by the image forming apparatus 30. Moreover, in the above embodiment, the description is made with regard to the print control for the XPS data. However, the present invention is not limited to the above example, and the present invention can be also applied to document data with any optional format capable of describing print setting information.

Further, the above embodiment is structure so that a print setting is conducted in the image forming apparatus. However, for example, in the case where RIP (Raster Image Processor) controller is connected to the network, the RIP controller may be adapted to have the function of the control section 31 of the image forming apparatus (specifically, the functions of the data analyzing section 34a, the Print Ticket analyzing section 34b, the print setting control section 34c and the print control section 34d).

The present invention can be applicable to an image forming apparatus for conducting a printing process with document data having a main boy of document data including print setting information, in particular the XPS data, and to a print control method and a control program for it.

According to the image forming apparatus, the print control method and the control program of the present invention, even in the case where print data having a main body of data including print setting information has been transmitted, a printing process can be conducted in accordance with the print setting information added to the main body of data.

The reasons are as follows. The first data analyzing section, the second data analyzing section, the memory section, the print setting control section and the print control section are provided as hardware or software to the control section of the image forming apparatus which conducts a printing process on the basis of print data containing document data as a printing target. The print setting control section updates the print setting information memorized in advance as default data in a predetermined memory area in the memory section on the basis of the first print setting information (for example, a PJL command) which is described in the outside of the main body of document data and analyzed by the first analyzing section. Thereafter, the print setting control section updates further the print setting information of setting items in the predetermined memory area on the basis of the second print setting information (for example, a Print Ticket in the XPS data) which is included in the main body of document data and analyzed by the second data analyzing section, except the setting items in which the print setting information has been updated on the basis of the first print setting information. Therefore, in the case where the first print setting information described in the outside of the main body of document data is different from the second print setting information included in the main body of document data, it becomes possible to prevent the first print setting information from being overwritten with the second print setting information.

What is claimed is:

1. An image forming apparatus which conducts a printing process by sequentially analyzing print data from a head thereof, the print data including document data as a printing target, and a command added at a position before the document data, the image forming apparatus comprising:
    a first analyzing section which analyzes first print setting information which is described in the command included in the print data;
    a second analyzing section which analyzes second print setting information which is described in a main body of the document data included in the print data;
    a memory section which has a predetermined memory area to store the print setting information;
    a print setting control section which updates print setting information stored in advance as default data in the predetermined memory area for each setting item based on the first print setting information and which allows thereafter print setting information in the predetermined memory area to be updated further based on the second print setting information except print setting information in a setting item in which the print setting information has been updated based on the first print setting information and further which does not allow print setting information in the predetermined memory area to be updated in a setting item in which the print setting information has been updated based on the first print setting information; and
    a print control section which controls the printing process based on the document data according to the print setting information stored in the predetermined memory area.

2. The image forming apparatus of claim 1,
    wherein when updating print setting information of default data for each setting item based on the first print setting information, the print setting control section makes the updated print setting information by setting a flag indicating "updatable or unupdatable" to "unupdatable" or by adding a flag indicating "unupdatable" for the setting item in which the print setting information is updated, and allows print setting information of a setting item in the predetermined memory area to be updated further based on the second print setting information, the setting item being provided with a flag indicating "updatable" or not being provided with the flag indicating "unupdatable".

3. The image forming apparatus of claim 2, wherein the print setting control section sets the flag corresponding to each of the setting items to "updatable" on the default state.

4. The image forming apparatus of claim 2, wherein the print setting control section sets the flag to "unupdatable" or add the flag indicating "unupdatable" for a setting item which is included in the first print setting information.

5. The image forming apparatus of claim 1, wherein the first print setting information is information described in a PJL command.

6. The image forming apparatus of claim 1, wherein the document data is XPS data and the second print setting information is information described in a Print Ticket in the XPS data.

7. A print control method for a system in which a host computer which sends print data including document data as a printing target and a command added at a position before the document data and an image forming apparatus which conducts a printing process by sequentially analyzing the received print data from a head thereof are connected by a network, the print control method comprising the steps of:

first processing to analyze first print setting information which is described in the command included in the print data received from the host computer and to update print setting information stored in advance as default data in a predetermined memory area for each setting item based on the first print setting information;

second processing to analyze second print setting information which is described in a main body of the document included in the print data to allow print setting information in the predetermined memory area to be updated further based on the second print setting information except print setting information in a setting item in which the print setting information has been updated based on the first print setting information and further which does not allow print setting information in the predetermined memory area to be updated in a setting item in which the print setting information has been updated based on the first print setting information; and third processing to control the printing process based on the print data according to the print setting information stored in the predetermined memory area.

8. The print control method of claim 7, wherein, when updating print setting information of default data for each setting item based on the first print setting information, the first processing includes making the updated print setting information by setting a flag indicating "updatable or unupdatable" to "unupdatable" or by adding a flag indicating "unupdatable" for the setting item in which the print setting information is updated, and the second processing includes allowing print setting information of a setting item in the predetermined memory area to be updated further based on the second print setting information, the setting item being provided with a flag indicating "updatable" or not being provided with the flag indicating "unupdatable".

9. The print control method of claim 8, wherein the flag corresponding to each of the setting items is set to "updatable" on the default state.

10. The print control method of claim 8, Wherein, in the first processing, the flag is set to "unupdatable" or the flag indicating "unupdatable" is added for a setting item which is included in the first print setting information.

11. The print control method of claim 7, wherein the first print setting information is information described in a PJL command.

12. The print control method of claim 7, wherein the document data is XPS data and the second print setting information is information described in a Print Ticket in the XPS data.

13. A non-transitory computer-readable recording medium having a control program stored thereon to be executed by a computer in an image forming apparatus which conducts a printing process by sequentially analyzing print data from a head thereof, the print data including document data as a printing target and a command added at a position before the document data, the computer comprising:

a first analyzing section which analyzes first print setting information which is described in the command included in the print data;

a second analyzing section which analyzes second print setting information which is described in a main body of the document data included in the print data; a memory section which has a predetermined memory area to store the print setting information;

a print setting control section which updates print setting information stored in advance as default data in the predetermined memory area for each setting item based on the first print setting information and which allows thereafter print setting information in the predetermined memory area to be updated further based on the second print setting information except print setting information in a setting item in which the print setting information has been updated based on the first print setting information and further which does not allow print setting information in the predetermined memory area to be updated in a setting item in which the print setting information has been updated based on the first print setting information; and a print control section which controls the printing process according to the print setting information stored in the predetermined memory area.

14. The non-transitory computer-readable recording medium of claim 13, wherein when updating print setting information of default data for each setting item based on the first print setting information, the print setting control section makes the updated print setting information by setting a flag indicating "updatable or unupdatable" to "unupdatable" or by adding a flag indicating "unupdatable" for the setting item in which the print setting information is updated, and allows print setting information of a setting item in the predetermined memory area to be updated further based on the second print setting information, the setting item being provided with a flag indicating "updatable" or not being provided with the flag indicating "unupdatable".

15. The non-transitory computer-readable recording medium of claim 14, wherein the print setting control section sets the flag corresponding to each of the setting items to "updatable" on the default state.

16. The non-transitory computer-readable recording medium of claim 14, wherein the print setting control section sets the flag to "unupdatable" or add the flag indicating "unupdatable" for a setting item which is included in the first print setting information.

17. The non-transitory computer-readable recording medium of claim 13,
wherein the first print setting information is information described in a PJL command.

18. The non-transitory computer-readable recording medium of claim 13,
wherein the document data is XPS data and the second print setting information is information described in a Print Ticket in the XPS data.

* * * * *